United States Patent [19]

Roemer, Jr.

[11] 4,221,068
[45] Sep. 9, 1980

[54] FISH LINE HOLDER

[76] Inventor: Leonhard J. Roemer, Jr., 27 Forgham Rd., Greece, N.Y. 14616

[21] Appl. No.: 970,001

[22] Filed: Dec. 15, 1978

[51] Int. Cl.³ .............................................. A01K 97/00
[52] U.S. Cl. ................................. 43/43.12; 43/44.87; 43/44.91
[58] Field of Search ....................... 24/134 R, 134 KB; 43/43.12, 43.1, 44.87, 44.88, 44.91

[56] References Cited

U.S. PATENT DOCUMENTS

| | | | |
|---|---|---|---|
| 2,440,989 | 5/1948 | Van Brunt | 43/44.88 X |
| 2,749,649 | 6/1956 | Fitzsimmmons | 43/43.12 |
| 3,318,036 | 5/1967 | McGuire | 43/44.88 X |
| 3,381,407 | 5/1968 | McDougall | 43/44.91 |
| 3,816,954 | 6/1974 | Bissonette | 43/43.12 |
| 3,874,110 | 4/1975 | Larson | 43/43.12 |
| 3,959,913 | 6/1976 | Weber | 43/43.12 |
| 4,069,611 | 1/1978 | Dusich | 43/43.12 |

Primary Examiner—Nicholas P. Godici
Attorney, Agent, or Firm—Stonebraker, Shepard & Stephens

[57] ABSTRACT

A fishline holder for down rigger fishing. The holder has a body with a first clamp in the form of a rotary shaft with a flattened side for clamping the body to control line or cable, to hold the body at the desired elevation in the water. A second clamp on the body has a jaw for clamping the fishing line and toggle links for operating the clamping jaw. A trigger has a recess for receiving the fishing line, and is so arranged that the trigger will be actuated to operate the toggle links to open the clamping jaw, either by rearward pull on the part of the fishing line which passes through the recess in the trigger, as when a fish takes the bait, or by an upward pull on another part of the fishing line also passing through the recess of the trigger, as when the fisherman in the boat pulls upwardly on his line.

9 Claims, 6 Drawing Figures

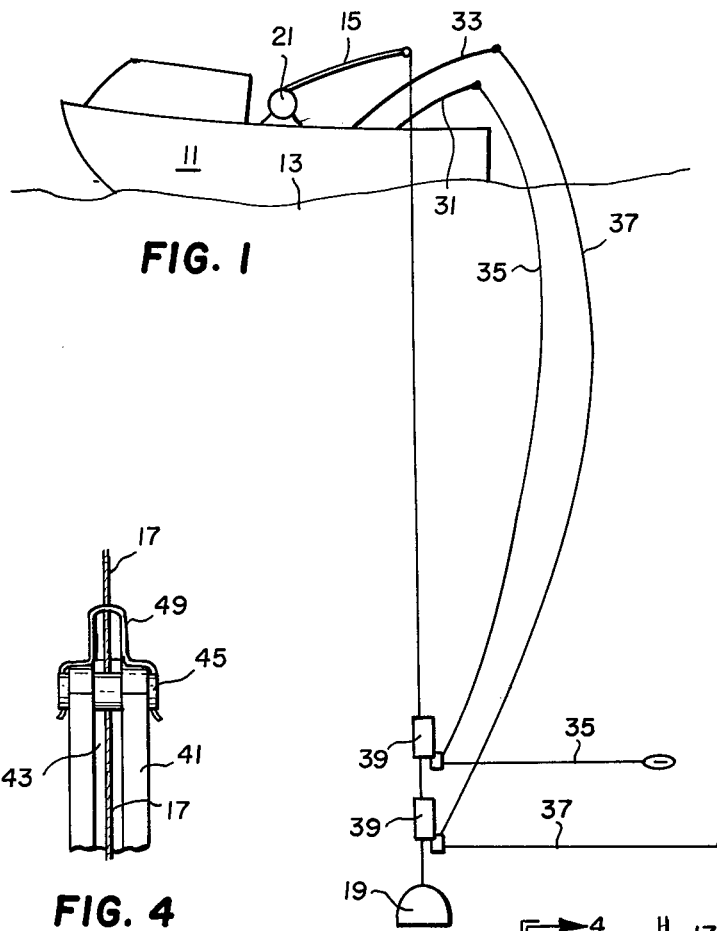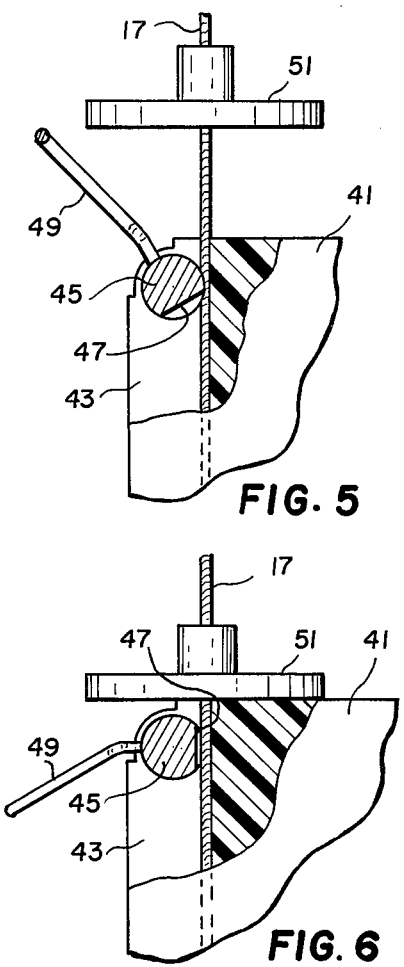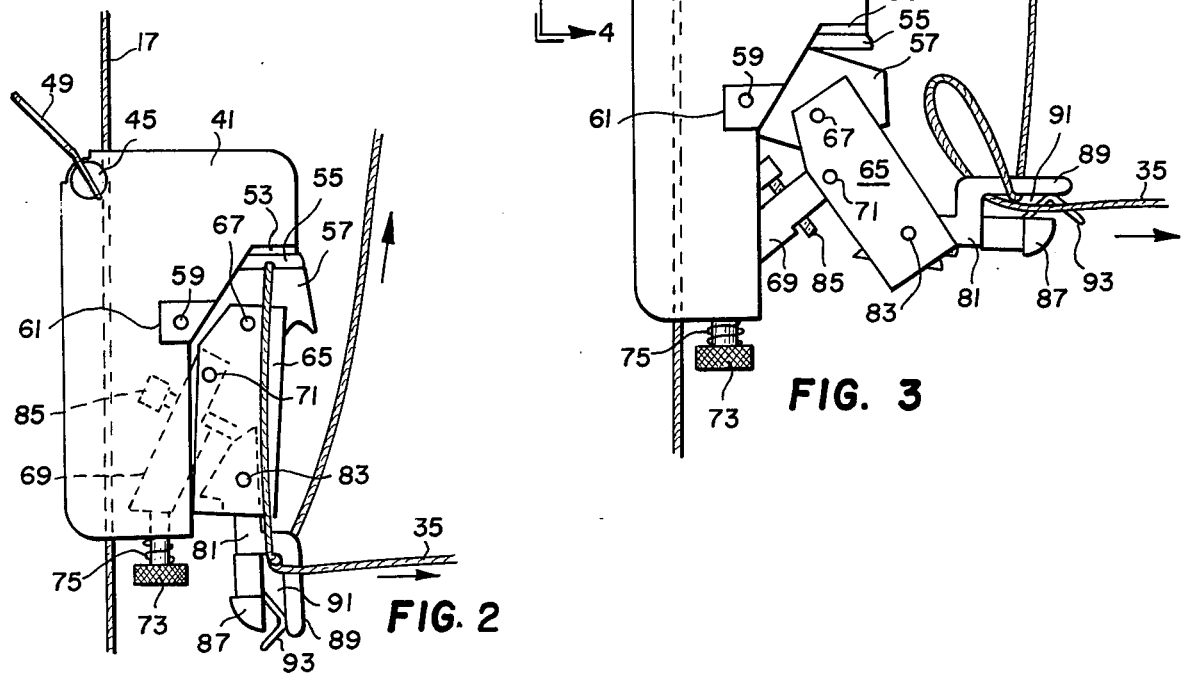

FISH LINE HOLDER

This invention relates to a fish line holder for holding a line at a predetermined depth below the surface of the water while trolling. Fishing in this way is sometimes referred to as down rigger fishing, and the various forms of apparatus used in this type of fishing are sometimes called down riggers.

From a boat on the surface of the water, a control line extends straight downward, with a relatively heavy weight at the bottom of this control line, sufficiently heavy so that as the boat moves forward in the trolling operation, the control line remains almost vertical, on account of the heavy weight. One or more fishing lines are releasably attached to this control line at desired depths below the surface of the water. Each of these fishing lines extends downwardly from a fish pole in the boat to its own individual holding device mounted on the control line at the required depth, and then this fish line extends from the holding device rearwardly (while the boat is in motion) any desired distance to the hook and bait.

It is to the holding device, mounted on the control line and detachably holding the fishing line, that the present invention particularly relates. Holding devices for the same general purpose are already known in the art.

For best results, the holding device should have the following characteristics:

1. It should be easily and quickly attachable to the control line and detachable therefrom when required.

2. It should be so constructed that when the control line is reeled in, the holding devices need not be individually detached from the control line as it is reeled in, but will begin to slide on the control line or cable when a certain point is reached during the reeling in, and the various devices will collect at the bottom of the control line when it is fully reeled in. Thus all of the holding devices may be removed together at the end of the reeling-in operation instead of having to stop the reeling operation to remove each holding device individually as it comes up to the gunwale of the boat.

3. The holding device should firmly grasp the fishing line so that the fishing line will not become accidentally or unintentionally released from the holding device, yet the holding device should release the fishing line instantly in response to the additional pull on the fishing line when a fish strikes the bait on the hook.

4. The degree of force with which the holding device holds or clamps the fishing line should be sufficient for all types of fishing line in all kinds or conditions of fishing. Also the degree of pull necessary to trigger the release of the clamping action, should be adjustable easily and quickly by the fisherman, to permit the device to be used under different fishing conditions, with different weights of fishing line, different lengths of line played out behind the holding device, different types of lure, and different speeds of trolling movement of the boat, all of which may create a different drag on the fishing line as the boat moves forward.

5. The holding device should be so constructed that the fishing line is not likely to become entangled or snarled on the holding device, so that when the strike of a fish on the bait triggers the device to release the line, the line will always play out away from the holding device and the complete line will then be under the direct control of the fisherman holding the fish pole to which the line is attached, without any impediment or intervention by the holding device.

6. The device should be constructed of such materials and in such manner that it is not subject to rust, warpage, or other damage by its use intermittently in the water and taken out of the water, and so constructed that it is long-lasting and sturdy.

7. The holding device must be so designed that it is capable of economical manufacture and can be sold at a price attractive to sport fishermen of modest means.

An object of the present invention is the provision of a holding device of the kind above described, which fulfills the above mentioned characteristics satisfactorily and in a way which is believed to be an improvement over the prior art.

BRIEF DESCRIPTION OF THE DRAWINGS

FIG. 1 is a schematic view of a boat on a body of water, with a control line or cable extending downwardly from the boat, two fish line holders attached to the control line, and two fishing lines releasably held by the respective holders in normal trolling position;

FIG. 2 is a side elevational view of a fish line holder according to a preferred embodiment of the invention, in clamped position;

FIG. 3 is a view similar to FIG. 2 with the holder in unclamped or released position, ready for the fishing line to be pulled away from the holders;

FIG. 4 is a fragmentary edge view of the device, taken in the direction 4—4 of FIG. 3 and illustrating the cable clamping means; and FIGS. 5 and 6 are fragmentary views illustrating the clamping means for clamping the holder in fixed location on the cable, respectively in clamped and unclamped position.

DETAILED DESCRIPTION

Referring now to the drawings, FIG. 1 shows schematically a boat 11 on a body of water 13. Mounted on the boat is an arm or pole or bracket 15 of any suitable kind, for supporting a control line or cable 17 at the end of which is a heavy weight 19 to keep the control line 17 approximately vertical, although of course it will trail at a slight rearward angle when the boat is moving forward slowly in the water during a trolling operation. A reel or winch 21 (frequently but not necessarily a power-driven winch) is associated with the supporting rod or pole 15, for reeling in and playing out the control line 17 as required.

The occupants of the boat have one or more fishing rods, two being shown schematically at 31 and 33, connected respectively to fishing lines 35 and 37, respectively, the inboard ends of the lines being attached to conventional fishing reels on the respective rods. The respective lines 35 and 37 go down into the water where they are detachably connected to fish line holders 39 mounted on the control line 17, there being a separate holder for each of the fishing lines 35 and 37. From these holders, the lines 35 and 37 then extend rearwardly to the respective hooks and bait. As the boat moves forward in the water, during the trolling operation, the lines 35 and 37 will extend rearwardly approximately horizontally from their respective holders to which they are releasably attached. The lines may extend as far rearwardly from the holders on the control line 17 as desired. Sometimes the hooks and bait and the rear end of the fishing line may be only a few feet rearwardly from its respective holder on the control line;

sometimes the fishing line may extend rearwardly through a much greater distance of many feet, if it is desired to place the hook and bait or other lure at a substantial distance behind the boat so that the fish will be less likely to be distracted from the bait by the passage of the boat.

The purpose of having the fishing line come down to a holder on the control line and then extend rearwardly from the holder, is to control the depth at which the portion of the fishing line to the rear of the holder will be pulled through the water. Depending upon the particular body of water and the particular species of fish for which the fisherman is angling, he may want to troll at a depth of a few feet or many feet, or at two or three different depths. Any reasonable number of holders can be secured to the same control line or cable at different depths, with a separate fishing line detachably secured to each holder. When a fish strikes, the line must be instantly released from the holder to which it was detachably secured, so that the fisherman may then begin to reel in the line by using the reel on his fishing rod to which that particular line is attached, and play the fish in the usual way until the fish is landed into the boat.

All of this equipment thus far described, except the detailed construction of the fish line holder itself, is conventional and well known in the art. The present invention relates only to the construction and operation of the holder itself.

Each holder is indicated in general at 39, the same numeral being used for both of them in FIG. 1 because both are identical. Referring now to the detailed views in FIGS. 2-6, each holder comprises a main body portion 41 of rigid plastic material, conveniently the plastic known as "Delrin," having at its rear edge a vertical groove 43 open at the rear for receiving the control line 17. In order to maintain each holder at the desired elevation on the control line or cable 17, each holder has a cable clamp comprising a short shaft 45 journalled in the side flanges of the groove 43 near the top thereof. One side of the shaft 45 is slightly flattened as at 47. A handle 49 of spring wire and of somewhat U-shape (see FIG. 4) has one end removably received in a diametrical groove formed in one end of the clamping shaft 45. The other end of the wire handle is retained permanently in a diametrical bore near the other end of the clamping shaft 45, so that the legs of the handle 49 straddle the thickness of the body 41.

The proportions of the parts are such that when the shaft 45 and handle 49 are in the position shown in FIG. 6, with the flat side 47 of the shaft parallel to the bottom of the groove 43, there is space for the cable 17 to move longitudinally in the groove, but when the handle is manually operated to turn the shaft to the position shown in FIG. 5, the cable is securely clamped, and the holder 41 can not move down the cable under the influence of gravity or any ordinary downward pull. However, when the cable is being reeled in, the top of the holder 41 comes up sharply against the pulley at the end of the pole 15 and its travel is suddenly stopped, and the upwardly travelling cable 17 then slips slightly upwardly relative to the suddenly stopped body 41. This motion of the cable causes turning of the clamping shaft 47 in a releasing direction (counterclockwise when viewed as in FIG. 5) so that the clamp becomes fully released to the FIG. 6 position.

Then the next fishline holder 39, 41 on the cable comes up sharply against the bottom of the previously stopped holder above it, and the sudden stoppage causes a slight slippage of the cable in this holder, which causes automatic release of the cable clamp of this holder. The same automatic unclamping action occurs in successive holders mounted on the same cable, as they are reeled in.

When using this automatic release of the cable clamp by producing a sharp blow on the holder 39, 41, vigorous enough to cause some slippage of the cable in the holder, the handle 49 does not serve to cause unclamping of the clamp. However, if one does not wish to rely upon the cable slippage to produce automatic release, an enlarged collar 51 may be loosely or floatingly placed on the cable just above each holder 39, 41. Then when the cable is reeled in and the collar 51 reaches a position where it can travel no farther, the handle 49 is forced against the stationary collar 51 and is turned thereby in a releasing direction, to release the clamp either fully or at least sufficiently to insure that the cable will slip so as to complete the turning of the clamping shaft to its fully unclamped position. The shape of the body 41 in the vicinity of the handle 49 serves as a limiting abutment for the handle, preventing it from moving counterclockwise beyond the fully released position shown in FIG. 6.

To remove a fishline holder completely from the cable, as distinguished from merely unclamping it so that the cable may slide through it, the user springs the spring wire handle 49 out of the diametrical slot at one end of the shaft 45 and swings it aside far enough to clear the body 41, to what may be called the ineffective position of the handle. The shaft may then be pushed endwise out of its bearings in the walls of the groove, completely freeing the cable for removal from the groove. A holder is placed on the cable by a reverse process, first placing the cable in the groove while the shaft 45 is absent, then inserting the shaft 45 endwise, and finally springing the resilient handle 49 into a position straddling the thickness of the body 41, which may be called the effective position of this handle or operating member.

This construction not only is efficient, but also is found to clamp and unclamp the cable or control line repeatedly without causing any damage or appreciable wear on the cable.

Turning now to a description of the mechanism for releasably clamping the fish line, the main body 41 has, at its front edge (that is, the edge opposite to the edge which contains the groove 43) a downwardly faced horizontal shelf portion 53 on which is mounted a resilient gripping pad 55 made of rubber or artificial rubber, cooperating with a jaw member 57 the free end of which is adapted to come up tightly against the resilient pad 55 for releasably clamping the fishing line. The opposite end of the jaw member 57 extends into a hollowed out portion or recess in the body 41 where it is mounted on a pivot 59. The side walls of the body 41 may be thickened outwardly at 61 in the vicinity of the pivot 59, to give additonal strength and support to the pivot, since this pivot is under considerable pressure or force during the clamping action.

For clamping the jaw 57 against the clamping pad 55, there is toggle action mechanism. This comprises a block 65, the upper end of which is recessed so as to straddle the free end of the jaw member 57 and it is pinned thereto by the pivot pin 67. Somewhat below this pivot 67, a recess or groove in the block 65 receives the upper end of a toggle member 69, pinned to the block 65 by a pivot pin 71. The lower end of the toggle member 69 enters the central hollowed out portion or groove in the main body 41 and, in the straightened condition of the toggle (seen in FIG. 2) bears against the upper end of the adjusting screw 73 threaded through the lower wall of the hollowed out portion of the body 41 and surrounded by a friction spring 75 which tends to hold the screw 73 in any position to which it is adjusted, yet allows it to be turned for adjustment purposes by exertion of a reasonable amount of finger force.

By adjustment of this screw 73, which forms an abutment for the lower end of the toggle lever 69, one can adjust the closed position of the jaw 57 with respect to the clamping pad 55, and thereby adjust the degree of pressure exerted on the fishing line held between the jaw 57 and the resilient pad 55.

There is a trigger mechanism or release mechanism for quick and easy release of the toggle, when the fishing line is to be released. This release trigger comprises a two-armed plastic lever 81 the upper end of which is engaged in a recess in the lower end of the toggle block 65 and pinned thereto by the pivot pin 83. The upper arm of this member 81, that is, the portion above the pivot pin 83, engages against the adjusting screw 85 threaded through a portion of the toggle lever 69 as readily seen from FIGS. 2 and 3. The lower arm of the lever 81, that is, the portion thereof below the pivot pin 83, is longer than the upper arm, in order to get a leverage advantage, and the lower portion of this upper arm is bifurcated or forked to form respective portions 87 and 89 with a groove 91 between them. A spring metal piece 93, mounted on the portion 87, extends angularly across this groove 91 as illustrated, tending to hold a fishing line in this groove if the line is inserted above the spring, but allowing the line to be pulled out by very slight pressure, which will spring the V-shaped portion of the spring away from the arm 89 and allow the line to slip past.

When setting up the apparatus, ready for a trolling operation, the fishing line is played out to the desired extent to place the hook and bait at the desired distance behind the boat, and the line is then attached to the holding device which has already been placed on the cable or control line 17 (but is still up at the level of the boat, and not down in the water) by running the line through the slot 91 between the arms 87 and 89, which is easily done because this slot is opened at the top except for the spring 93 which is a light spring easily moved aside. Then after passing through the slot 91, the line is looped once between the jaw 57 and its cooperating pad 55 (the clamping jaw being open at this time, of course) and then run in once more through the slot 91 in the opposite direction to the first pass through this slot. The jaw mechanism is then closed to the position shown in FIG. 2, and the fishing line would be in the position indicated in this view.

The device may now be lowered into the water to the desired depth, by operating the reel or winch 21 on which the control line 17 is wound, and simultaneously playing out the fishing line from the fishing reel on its pole to the required extent. During this downward motion into the water, the fishing line cannot accidentally come loose from the holder, as it is firmly clamped between the jaws 55 and 57.

When the fish strikes the bait, the resulting rearward pull on the fishing line causes a rearward pull on the lower arm portion 89 of the toggle trigger member 81. This swings the trigger member on its pivot 83, and presses the upper arm of the trigger member against the abutments screw 85 with a considerable lever advantage on account of the much longer lower arm than the shorter upper arm of the trigger member. The toggle mechanism, in clamped position, is a little beyond dead center, with the pivot 71 a little forwardly of a straight line from the pivot 67 to the point of contact with the end of the screw 73. But the action of the trigger 81, reacting against the screw 85, pries the lower end of the toggle block 65 in a rearward direction (that is, toward the direction of the fish), there being a second leverage factor here because the lever arm from the pivot 83 to the pivot 71 is much greater than the lever arm from the pivot 71 to the pivot 67, so that one obtains this mechanical advantage in addition to the previously mentioned mechanical advantage obtained by the dimentioning of the lever arms of the trigger member 81. So the action of opening the toggle is swift and easy. The clamping action is instantly released, and the line quickly slips out from the clamping jaws 55–57 and also from behind the light spring 93 in the slot 91, the line thus becoming completely free of the holding device and coming under complete control of the fisherman in the boat.

When it is desired to reel in the control line 17, either at the end of the day's fishing or for the purpose of resetting lines that have been released from the holders during the fishing operation, the control line 17 is simply reeled in by using the winch 21, the individual fishing lines being simultaneously reeled in by the fishing reels on their respective poles. If there happened to be several holding devices on a single cable or control line, at various spaced intervals along the control line, it is not necessary to stop the reeling in process as each holding device comes up to the gunwale of the boat for the purpose of removing the holding device from the control line, as must be done with certain prior art devices. On the contrary, the reeling in of the control line can proceed continuously until it is all reeled in as already explained. This is a great convenience in speed reeling-in of the apparatus, particularly when several different holding devices have been attached to each control line (of which there may be two or more on each boat) and this capability helps to make down rigger fishing a most pleasurable sport, eliminating much of the unpleasant chore which in the past has been associated with the handling of the lines in this type of fishing.

Whenever the fisherman may wish to release his line from the holding device on the cable, this is done easily and instantly by giving a sharp upward jerk to the line. As seen in FIG. 2, an upward pull on the line will apply force to the trigger somewhat rearwardly of the pivot 83, thereby turning the trigger to release the toggle in the same way as is done by a rearward pull produced when a fish takes the bait.

What is claimed is:

1. A fish line holder for down rigger fishing, comprising a body, first means for releasably holding said body at a desired elevation on a control cable, and second means for releasably clamping a fishing line to said body, said first means including a rotary shaft clamping said cable in one rotational position of said shaft and releasing said cable in another rotational position of said shaft, and an operating member on said shaft for rotating said shaft between its clamping position and its release position, said operating member being movable relative to said shaft between an effective position and an ineffective position, said shaft being axially movable to free said cable for complete detachment from said body when said operating member is in its ineffective position, said operating member serving to prevent sufficient axial movement of said shaft to enable complete detachment of said cable, when said operating member is in its effective position.

2. A fish line holder for down rigger fishing, comprising a body, first means for releasably holding said body at a desired elevation on a control cable, and second means for releasably clamping a fishing line to said body, said second means including a movable clamping jaw for clamping a fishing line, toggle mechanism for operating said clamping jaw, and a release trigger for moving said toggle mechanism past a dead center position to release said clamping jaw.

3. The invention defined in claim 2, wherein said release trigger includes a recess for engaging said fishing line at two points along the length of the line on opposite sides of the point at which the line is held by said clamping jaw.

4. The invention defined in claim 3, wherein said trigger is so shaped that when said body is in normal fishing position, a rearward pull on a fishing line extending rearwardly from said recess will activate said trigger to operate said toggle to release said clamping jaw, and an upward pull on a fishing line extending upwardly from said recess will also activate said trigger to operate said toggle to release said clamping jaw.

5. The invention defined in claim 3, further including a spring resiliently tending to maintain said fishing line in said recess, a light pull on said line in a direction out of said recess being sufficient to displace said spring and allow said line to be withdrawn from said recess.

6. The invention defined in claim 2, wherein said toggle mechanism includes an adjusting screw having a portion which forms a bearing abutment for one link of said toggle mechanism, so arranged that adjustment of said screw serves to adjust the clamping force exerted by said jaw when said toggle mechanism is straightened to a dead center position.

7. The invention defined in claim 2, wherein said toggle mechanism includes two links pivoted to each other, one of said links being pivoted also to said clamping jaw, and wherein said release trigger is pivoted to one of said links, and further including an adjusting screw on the other of said links, said adjusting screw having an end against which said trigger bears when said trigger is activated to cause the two links to move relative to each other past a dead center position.

8. A fish line holder for down rigger fishing, comprising a body, first means for releasably holding said body at a desired elevation on a control cable, and second means for releasably clamping a fishing line to said body, said first means including a rotary shaft of substantially circular cross section concentric with the axis of rotation of the shaft throughout the major portion of its periphery and having a flat spot at one portion of its periphery, said shaft being positioned to engage said cable and clamp said cable to said body when said shaft is turned so that a corner at one end of said flat spot is against the cable, the parts being so proportioned that a sharp tug on the cable will cause the cable to slip slightly relative to the body and such slipping will turn the shaft to bring the flat spot approximately parallel to the cable and thereby release the cable for free longitudinal movement.

9. A fish line holder for down rigger fishing, comprising a body to which a fish line may be releasably attached, said body having a groove for receiving a downrigger cable, and a rotatable shaft extending crosswise of said groove relatively close to a bottom surface thereof, said shaft having a circular periphery throughout the major portion of its circumference and a flat spot at one portion of its circumference and being so arranged relative to said bottom surface of said groove that when said flat spot is faced toward and is parallel to said bottom surface, there is sufficient space between said flat spot and said surface for a downrigger cable in said space to move freely longitudinally, and when said shaft is turned to place said flat spot at a substantial angle to said surface, a corner at one end of said flat spot will engage tightly against said cable, and upon application of sufficient force to cause slippage of said cable along said groove in a direction tending to bring said flat spot into parallel relation to said surface, such slippage will slightly turn said shaft and will cause quick release of said cable and permit it to move freely along said groove.

* * * * *